Oct. 10, 1961     O. DROLSHAGEN ET AL     3,003,941

NUCLEAR REACTOR

Filed Nov. 12, 1958     8 Sheets-Sheet 3

INVENTORS.
OTTO DROLSHAGEN
ROY E. MANOLL
BY
*R. Fredrick Lamann*
ATTORNEY

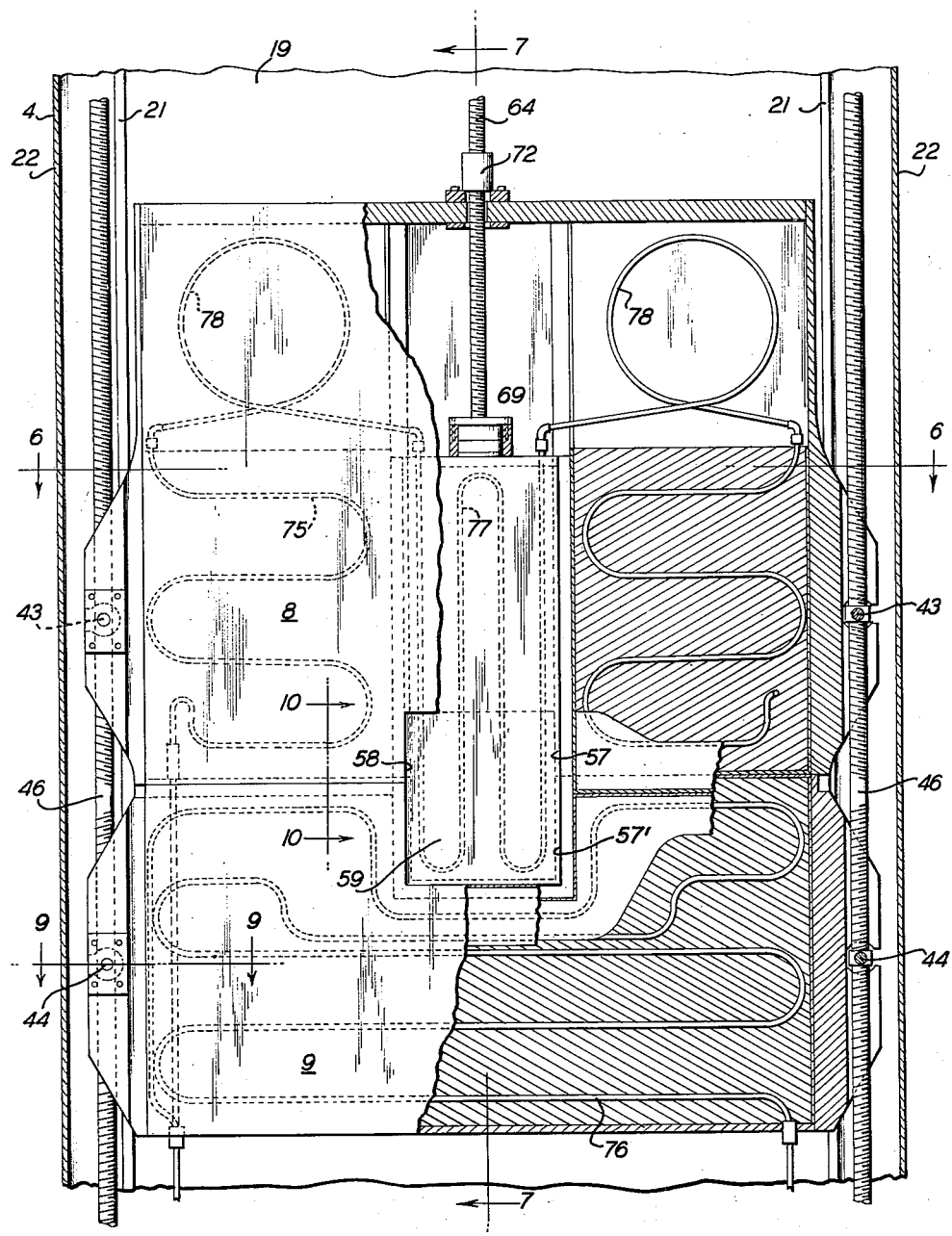

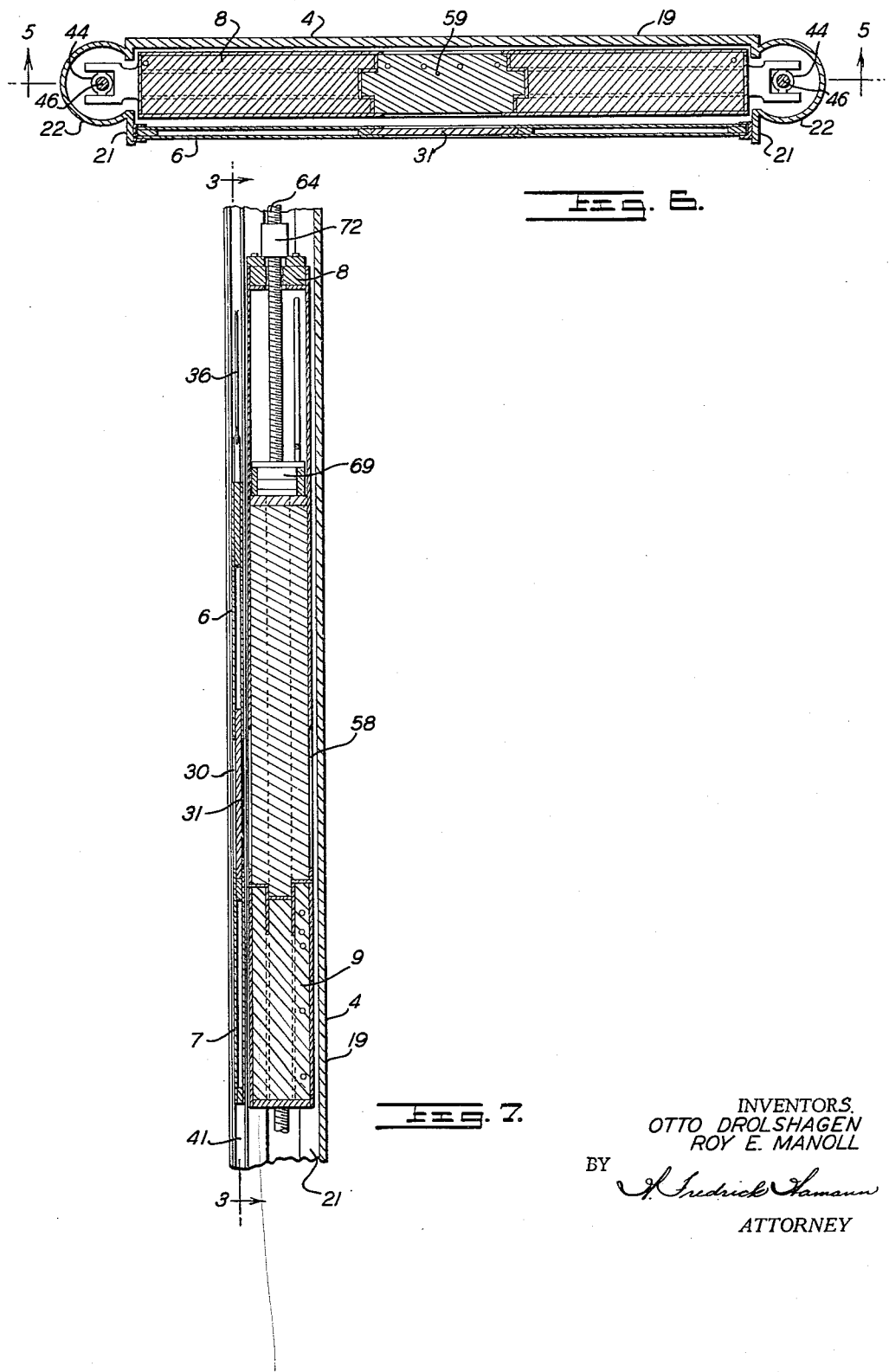

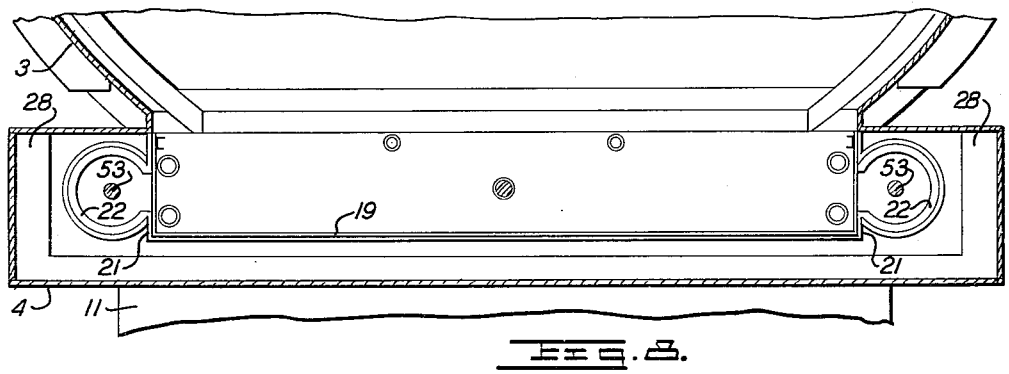
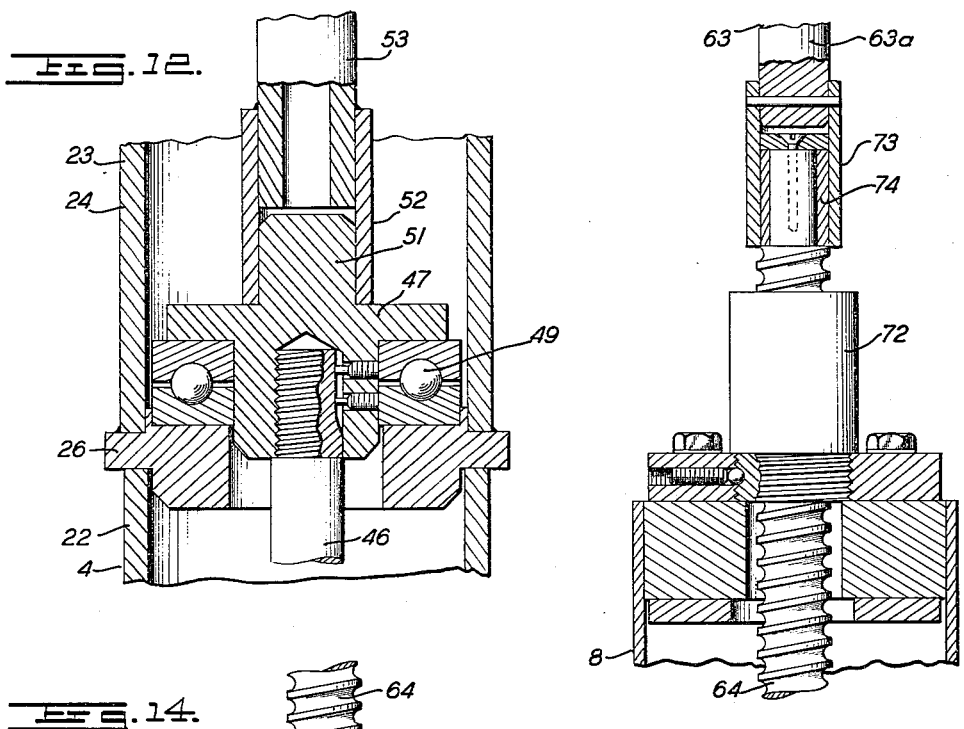
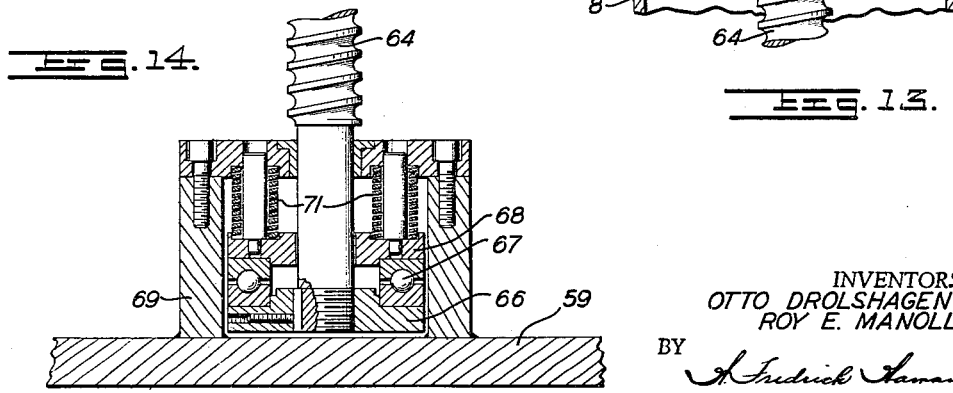

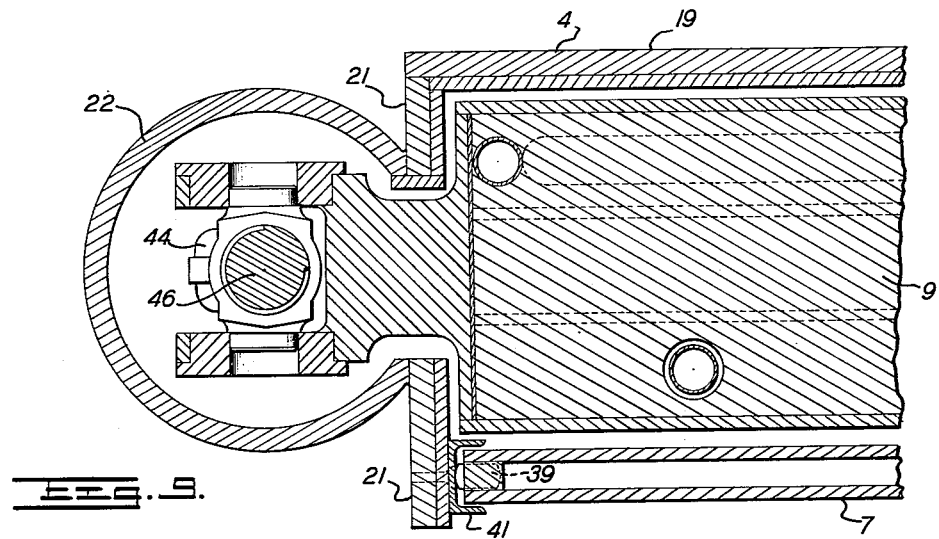
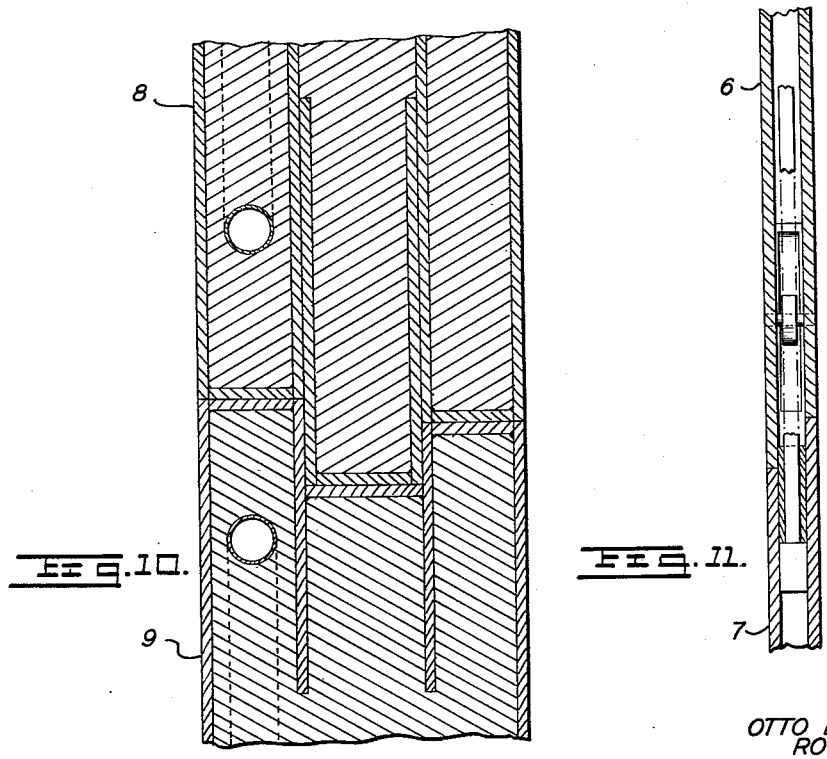

INVENTORS.
OTTO DROLSHAGEN
ROY E. MANOLL
BY
ATTORNEY

United States Patent Office 3,003,941
Patented Oct. 10, 1961

3,003,941
NUCLEAR REACTOR
Otto Drolshagen, Milan, Italy, and Roy E. Manoli, Silver Spring, Md., assignors, by mesne assignments, to Allis-Chalmers Manufacturing Company, a corporation of Delaware
Filed Nov. 12, 1958, Ser. No. 773,392
8 Claims. (Cl. 204—193.2)

This invention relates to nuclear reactors and, more particularly, to tank-type heterogeneous reactors adapted for use in conducting irradiation experiments.

Reactors of this general type comprise a core of fissionable fuel elements supported within a tank containing a fluid moderator, such as heavy water, the tank being enclosed within a thermal shield and a biological shield. For conducting neutron and gamma ray experiments, the reactor is provided with beam ports and a thermal column which extend from adjacent the tank through the thermal and biological shields. Movable lead gates are provided between the tank and the thermal column, and a movable door is provided to cover the exterior side of the thermal column.

An object of the present invention resides in the provision of a tank-type nuclear reactor structure wherein the thermal shield is formed integral with a housing for supporting and guiding lead gates and boral curtains into and out of registry with the inner face of the thermal column.

Another object of the invention resides in the provision of a pair of lead gates and a pair of boral curtains provided with movable shutters to open and close small openings provided in the gates and curtains.

A further object of the invention resides in the provision of means for opening and closing the gates and boral curtains and the shutters associated therewith.

Another object resides in the provision of means for cooling the lead gates and lead shutter when the lead gates are in open or closed position.

The invention embodies other novel features, details of construction and arrangement of parts which are hereinafter set forth in the specification and claims and illustrated in the accompanying drawings, forming part thereof, wherein:

FIG. 5 is an enlarged fragmentary section taken along the line 5—5 of FIG. 6 showing the lead gates and the lead shutter.

FIG. 6 is a transverse section taken along the line 6—6 of FIG. 5.

FIG. 7 is a fragmentary vertical section taken along the line 7—7 of FIG. 5.

FIG. 8 is an enlarged fragmentary transverse section taken along the line 8—8 of FIG. 2.

FIG. 9 is an enlarged fragmentary transverse section taken along the line 9—9 of FIG. 5.

FIG. 10 is an enlarged fragmentary vertical section taken along the line 10—10 of FIG. 5.

FIG. 11 is a fragmentary vertical section taken along the line 11—11 of FIG. 3.

Figure 2:
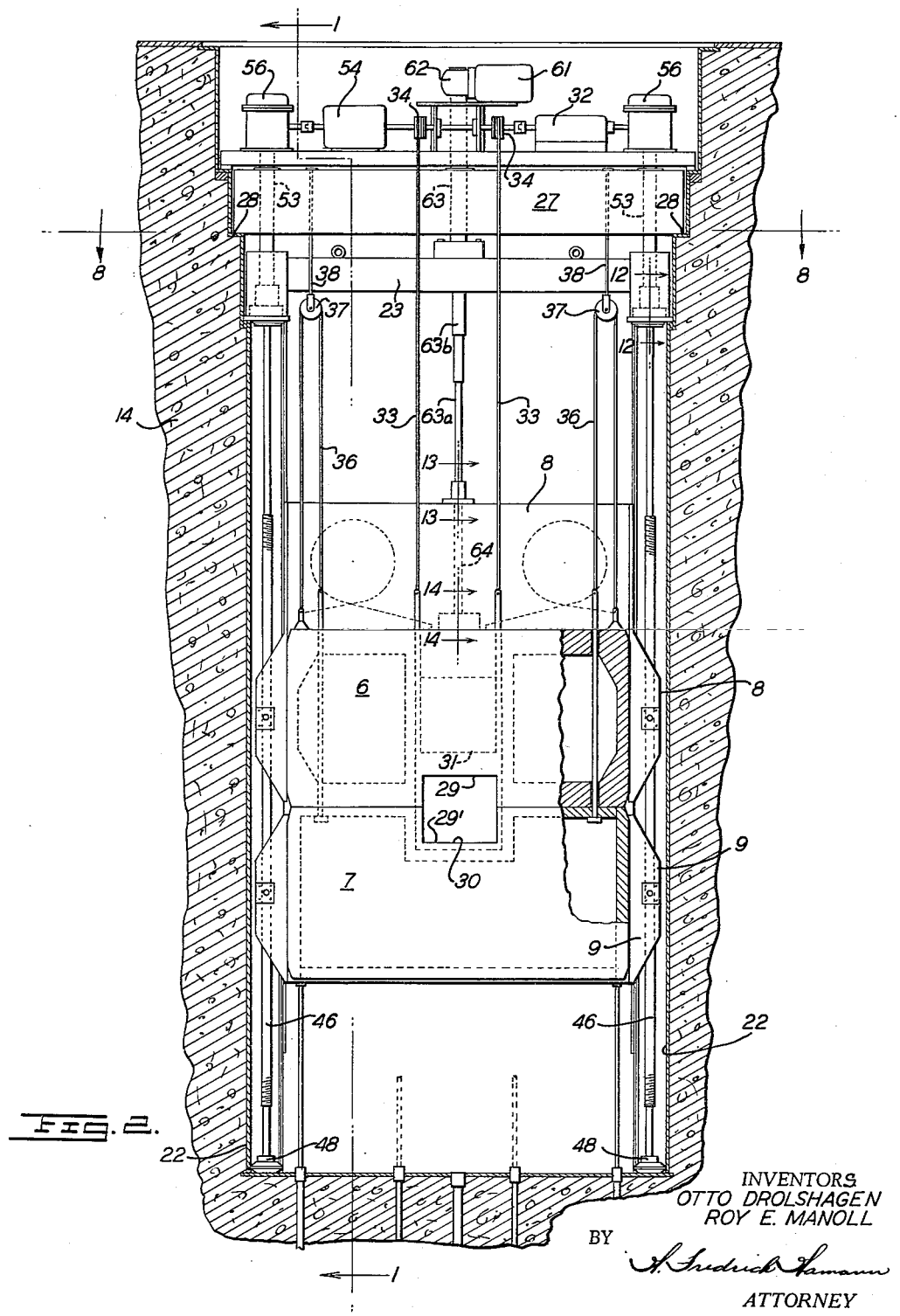
FIG. 2 is a fragmentary vertical section taken along the line 2—2 of FIG. 1.

FIGS. 12, 13 and 14 are sectional views taken along the lines 12—12, 13—13 and 14—14, respectively, of FIG. 2.

Figure 15:
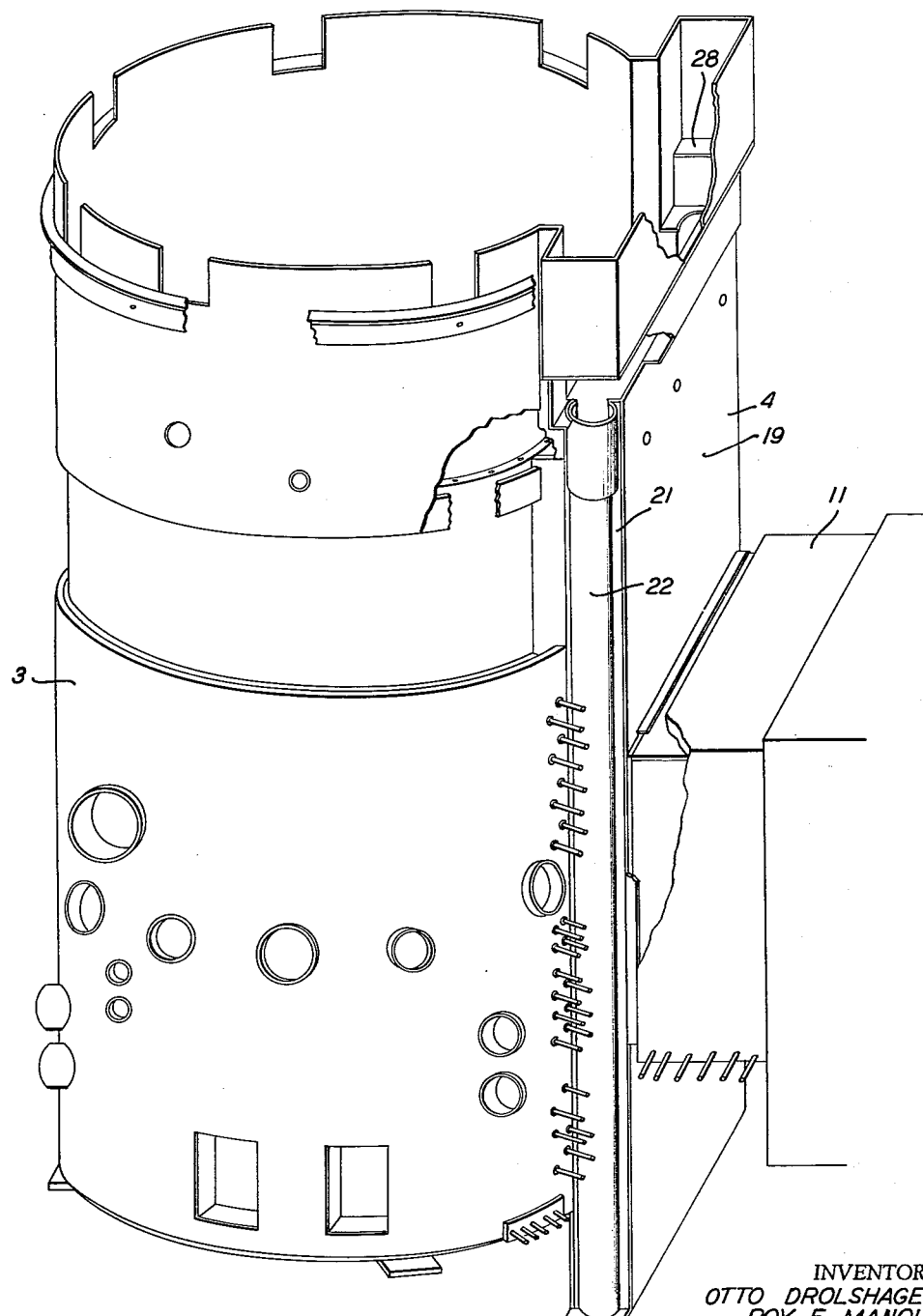

FIG. 15 is a perspective view illustrating the thermal shield provided with housings for the lead gates, boral curtains, and the graphite thermal column.

Figure 1:
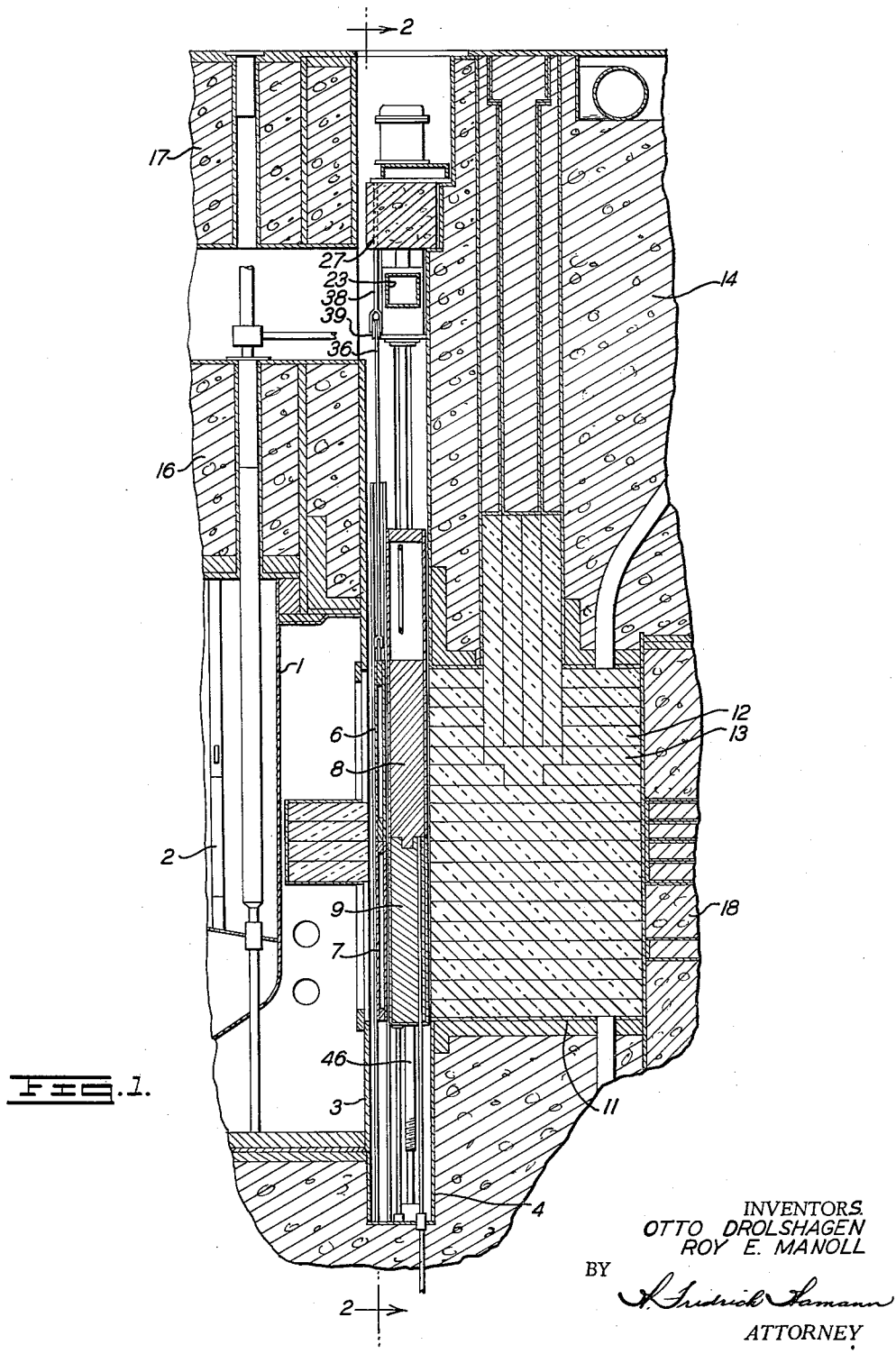
FIG. 1 is a fragmentary vertical section, taken along the line 1—1 of FIG. 2, showing a tank-type heterogeneous nuclear reactor embodying features of the invention.

Referring now to the drawings for a better understanding of the invention and, more particularly, to FIGS. 1 and 2 therein, the nuclear reactor is shown as comprising a tank 1 adapted to contain a core of fissionable enriched uranium fuel elements 2 and a moderating liquid, such as heavy water. The tank 1 is enclosed within a thermal shield 3 which is formed integral with a housing 4 adapted to receive boral curtains 6 and 7 and lead gates 8 and 9. A housing 11 projects laterally from the housing 4 to receive graphite blocks 12 to provide a thermal column 13 in horizontal alignment with the fuel core within the tank 1.

As used herein, the term "boral" refers to a uniform dispersion of boron carbide crystals ($B_4C$) in metallic aluminum as described in AECD-3625 titled "Boral: A New Thermal Neutron Shield," issued May 1954.

The thermal shield 3 and housings 4 and 11 are enclosed within a concrete biological shield 14 formed with an opening above the tank 1 to receive removable inner and outer shield plugs 16 and 17, respectively. The biological shield is also formed with a side opening to receive a removable concrete door 18 to cover the external side of the thermal column 13. The reactor is provided with the usual experimental ports which extend from adjacent the tank 1 through the thermal and biological shields 3 and 14, respectively.

The housing 4 is shown as comprising a vertical wall 19 spaced from and connected to the thermal shield 3 by side walls 21—21 formed with columns 22—22 of arcuate section supported upon the biological shield. As illustrated in FIG. 1, the thermal shield 3 and housing wall 19 are formed with horizontally aligned openings in registry with the inner face of the thermal column 13. A cross beam 23 of box section is provided with tubular end sections 24—24 (FIG. 12) having plug rings 26—26 therein for engagement against the upper ends of their respective columns 22—22. A motor support member 27 is disposed in vertical alignment above the cross beam 23 and supported at its ends upon shelves 28—28 provided on the upper end of the thermal shield 3.

Each of the boral curtains 6 and 7 comprises sheets of boral secured to opposite sides of aluminum spacing members to form rigid rectangular structures having recesses 29—29¹ in their abutting edges to define a window 30 for the passage of neutrons from the core to the thermal column 13. A boral shutter 31 is slidable vertically within the upper boral curtain 6 to move into or out of registry with the window 30 responsive to operation of a reversible electric motor 32 mounted on the support member 27, the shutter being suspended from cables 33—33 secured to cable drums 34—34 driven by the motor.

Figure 3:
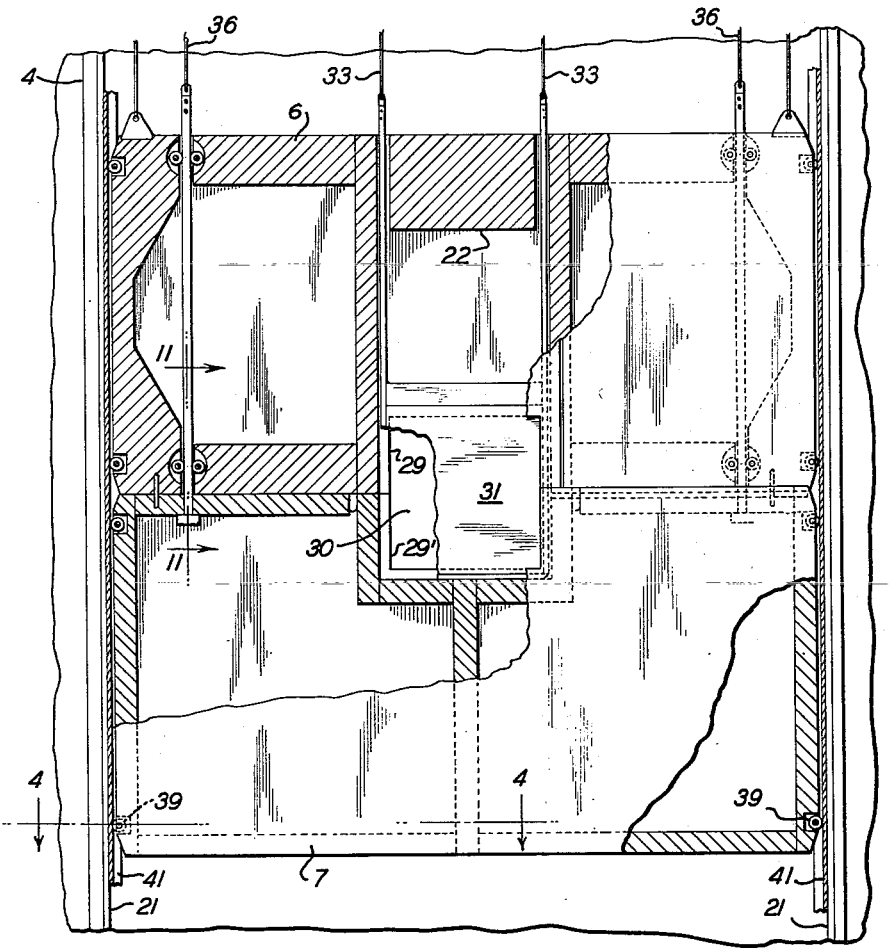
FIG. 3 is an enlarged fragmentary vertical section, taken along the line 3—3 of FIG. 7, illustrating the boral curtains and boral shutter.
Figure 4:
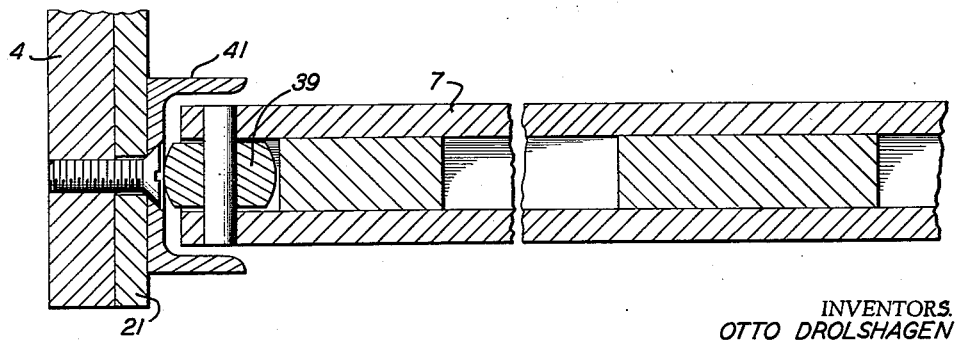
FIG. 4 is an enlarged fragmentary section taken along the line 4—4 of FIG. 3.

The boral curtains 6 and 7 are suspended from opposite ends of cables 36—36 which extend around pulleys 37—37 journaled on hangers 38—38 secured to the support member 27, the curtains being provided with rollers 39 (FIG. 3) for movement along channel tracks 41—41 secured to the side walls 21—21. During upward movement, the boral shutter 31 first moves out of registry with the window 30 and then engages a shoulder 42 on the boral curtain 6 to move the latter upwardly and to cause the curtain 7 to move downwardly by gravity. When the shutter 31 is moved downwardly, the upper boral curtain 6 is lowered by gravity and acts through the cables 36—36 to raise the relatively light weight lower curtain 7.

The lead gates 8 and 9 are provided at their ends with trunnion nuts 43—43 and 44—44, respectively, for threaded engagement with reversely threaded actuating shafts 46—46 having their upper ends secured to thrust nuts 47—47 (FIG. 12) and their lower ends journaled in anti-friction bearings 48—48 (FIG. 2). Thrust bearings 49—49 are interposed between the thrust nuts 47—47 and their respective plug rings 26—26 to support the shafts 46—46 and the lead gates 8 and 9. The thrust nuts 47—47 are formed with square shanks 51—51 for detachable engagement in square sockets 52—52 provided on the lower ends of drive shafts 53—53. The drive shafts 53—53 are driven by a reversible electric motor 54 acting through suitable speed reduction units 56—56 to move the lead gates 8 and 9 either toward or away from each other.

When the lead gates 8 and 9 are in abutting engagement, as shown in FIG. 5, recesses 57—57$^1$ therein define an opening 58 for registry with the opening 30 defined by the recesses 29—29$^1$ in the boral curtains 6 and 7. A lead shutter 59 is mounted for vertical sliding movement within the upper lead gate 8 to open or close the opening 58 responsive to operation of a reversible electric motor 61 acting through a speed reduction unit 62, a drive shaft 63 and a drive screw 64.

A thrust nut 66 (FIG. 14) is secured to the lower end of the drive screw 64 for engagement against a thrust bearing 67 seated against a spring plate 68 disposed within a bearing housing 69 on the lead shutter 59 (see FIG. 14). Compression springs 71 are interposed between the plate 68 and the housing 69 to resiliently support the lead shutter. A nut 72 is secured to the upper end of upper lead gate 8 for threaded engagement with the upper end of the drive screw 64, whereby rotation of the screw acts to move the lead shutter 59 vertically relative to the gate 8. The drive shaft 63 comprises a lower section 63$^a$ telescopically engaged within an upper section 63$^b$ for axial and non-rotational movements relative thereto. The lower end of the drive section 63$^a$ is provided with a square socket 73 for detachable engagement with a square bushing 74 on the drive screw 64.

In the use of the reactor for conducting irradiation experiments, the boral shutter 31 and lead shutter 59 may be raised to their open positions by energizing their respective drive motors 32 and 61 to provide a relatively small opening leading from the core tank 1 to the thermal column 13.

To provide a larger opening leading to the thermal column, the motor 32 acts through the cables 36—36 and boral shutter 31 to raise the upper boral curtain 6 and cause the lower boral curtain 7 to descend by gravity. The motor 54 is also energized to rotate the reversely threaded screws 46—46 to raise the lead gate 8 and lower the lead gate 9, the lead shutter 59 being carried upwardly by the gate 8.

When the lead gates 8 and 9 are in open or closed position, cooling fluid may be continuously circulated through interconnected conduits 75 and 76 embedded therein, and also through conduits 77 embedded in the lead shutter 59. The conduits 75 and 77 are interconnected by flexible conduits 78 to permit movement of the lead shutter 58 relative to the gate 8.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a nuclear reactor, a core of fissionable material, a graphite thermal column to provide a source of thermal neutrons, lead gates and boral curtains interposed between said core and thermal column and having recesses therein defining openings therethrough for the passage of neutrons from the core to the thermal column, shutters movable into and out of registry with their respective openings, and means to move said shutters.

2. In a nuclear reactor, a core of fissionable material, a graphite thermal column to provide a source of thermal neutrons, lead gates and boral curtains interposed between said core and thermal column and having recesses therein defining openings therethrough for the passage of neutrons from the core to the thermal column, shutters movable into and out of registry with their respective openings, and means to move said shutters, said lead gates comprising vertically aligned upper and lower gate members movable into and out of abutting engagement, and means to move said gate members.

3. In a nuclear reactor, a core of fissionable material, a graphite thermal column to provide a source of thermal neutrons, lead gates and boral curtains interposed between said core and thermal column and having recesses therein defining openings therethrough for the passage of neutrons from the core to the thermal column, shutters movable into and out of registry with their respective openings, and means to move said shutters, said lead gates comprising vertically aligned upper and lower gate members movable into and out of abutting engagement, and means to move said gate members, said boral curtains comprising vertically aligned upper and lower curtain members movable into and out of abutting engagement, and means to move said curtain members.

4. In a nuclear reactor, a core of fissionable material, a graphite thermal column to provide a source of thermal neutrons, lead gates and boral curtains interposed between said core and thermal column and having recesses therein defining openings therethrough for the passage of neutrons from the core to the thermal column, shutters movable into and out of registry with their respective openings, and means to move said shutters, said lead gates comprising vertically aligned upper and lower gate members movable into and out of abutting engagement, and means to move said gate members, said boral curtains comprising vertically aligned upper and lower curtain members movable into and out of abutting engagement, and means to move said curtain members, said shutters being mounted for vertical movement within their respective upper gate members and upper curtain members.

5. In a nuclear reactor, a core of fissionable material, a graphite thermal column to provide a source of thermal neutrons, a pair of vertically aligned lead gates interposed between said core and thermal column, reversely threaded shafts extending vertically along opposite ends of said gates, nuts on opposite ends of each gate in threaded engagement with their respective shafts, and means to rotate said shafts to vary the relative positions of said gates, a pair of vertically aligned boral curtains interposed between said core and thermal column, and means to vary the relative positions of said curtains.

6. In a nuclear reactor, a core of fissionable material, a graphite thermal column to provide a source of thermal neutrons, a pair of vertically aligned lead gates interposed between said core and thermal column, reversely threaded shafts extending vertically along opposite ends of said gates, nuts on opposite ends of each gate in threaded engagement with their respective shafts, and means to rotate said shafts to vary the relative positions of said gates, a pair of vertically aligned boral curtains interposed between said core and thermal column, and means to vary the relative positions of said curtains, and a thermal shield providing a guide housing for said gates and curtains.

7. In a nuclear reactor, a core of fissionable material, a graphite thermal column to provide a source of thermal neutrons, a pair of vertically aligned lead gates interposed between said core and thermal column, reversely threaded shafts extending vertically along opposite ends of said gates, nuts on opposite ends of each gate in threaded engagement with their respective shafts, means to rotate said shafts to vary the relative positions of said gates, a pair of vertically aligned boral curtains interposed between said core and thermal column, means to vary the relative positions of said curtains, a thermal shield providing a guide housing for said gates and curtains, the upper boral curtain having an opening therein for registry with said lead gate opening, a boral shutter mounted on said upper boral curtain for movement into and out of registry with said boral curtain opening, and means to move said boral shutter relative to said upper boral curtain.

8. In a nuclear reactor, a core of fissionable material, a graphite thermal column to provide a source of thermal neutrons, a pair of vertically aligned lead gates interposed between said core and thermal column, reversely threaded shafts extending vertically along opposite ends of said gates, nuts on opposite ends of each gate in threaded engagement with their respective shafts, means to rotate said shafts to vary the relative positions of said gates, a pair of vertically aligned boral curtains interposed between said core and thermal column, means to vary the relative positions of said curtains, a thermal shield providing a guide housing for said gates and curtains, the upper boral curtain having an opening therein for registry with said lead gate opening, a boral shutter mounted on said upper boral curtain for movement into and out of registry with said boral curtain opening, and means to move said boral shutter relative to said upper boral curtain, said last mentioned means also being operable to move said boral curtains.

References Cited in the file of this patent

UNITED STATES PATENTS

| | | |
|---|---|---|
| 591,224 | Ycre | Oct. 5, 1897 |
| 1,149,157 | Unbehaun | Aug. 3, 1915 |
| 2,836,729 | Snarr | May 23, 1958 |
| 2,911,343 | Braffort et al. | Nov. 3, 1959 |